United States Patent
Bentley et al.

(10) Patent No.: US 8,817,952 B2
(45) Date of Patent: Aug. 26, 2014

(54) METHOD, APPARATUS, AND SYSTEM FOR PROVIDING REAL-TIME PSAP CALL ANALYSIS

(71) Applicant: Avaya Inc., Basking Ridge, NJ (US)

(72) Inventors: Jon Bentley, New Providence, NJ (US); Mark Fletcher, Ringwood, NJ (US); Joseph L. Hall, Basking Ridge, NJ (US); Avram Levi, Hoboken, NJ (US); Paul Roller Michaelis, Louisville, CO (US); Heinz Teutsch, Green Brook, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/832,741

(22) Filed: Mar. 15, 2013

(65) Prior Publication Data

US 2014/0169534 A1 Jun. 19, 2014

Related U.S. Application Data

(60) Provisional application No. 61/736,959, filed on Dec. 13, 2012.

(51) Int. Cl.
*H04M 11/04* (2006.01)
*G10L 15/00* (2013.01)
*G10L 15/16* (2006.01)

(52) U.S. Cl.
USPC ............................. 379/45; 704/233; 704/243

(58) Field of Classification Search
USPC ................... 379/32.01, 32.04, 37, 38, 45, 47; 455/401.01; 700/28, 29, 30, 83, 231, 700/233, 237, 243, 246
See application file for complete search history.

(56) References Cited

U.S. PATENT DOCUMENTS

| | | | | |
|---|---|---|---|---|
| 8,036,716 B2 * | 10/2011 | Dunn et al. | | 455/570 |
| 8,175,007 B2 | 5/2012 | Jain et al. | | |
| 8,204,884 B2 * | 6/2012 | Freedman et al. | | 707/737 |
| 2004/0249650 A1 * | 12/2004 | Freedman et al. | | 705/1 |
| 2007/0206505 A1 * | 9/2007 | Forbes | | 370/252 |
| 2009/0197564 A1 * | 8/2009 | Dunn et al. | | 455/404.1 |
| 2012/0052872 A1 * | 3/2012 | Do | | 455/456.1 |
| 2012/0185068 A1 * | 7/2012 | Eppolito | | 700/94 |

OTHER PUBLICATIONS

WEBB (Wireless Emergency Breaker Beacon): Silent Guardian Application http://9-1-1.com/wordpress/2012/08/15/father-son-duo-create-app-that-silently-calls-911/.
Durham, NC text to 911 http://9-1-1.com/wordpress/2012/08/07/durham-to-continue-911-texts-program/.

* cited by examiner

*Primary Examiner* — Binh Tieu
(74) *Attorney, Agent, or Firm* — Sheridan Ross P.C.

(57) ABSTRACT

Methods, apparatus, and systems are provided such that a Public Safety Answering Point (PSAP) may utilize a new model to handle Open Line emergency calls, including audio optimization, automation, analysis, and presentation. Embodiments of the present disclosure assist with the difficult task of identifying background noise while trying to listen and talk to a caller, and give the best possible audio from the caller to the emergency call-taker or dispatcher. More particularly, an audio stream is split into at least two instances, with a first instance being optimized for speech intelligibility and provided to a call-taker or dispatcher and a second instance being provided for background sound analysis. Accordingly, the new PSAP Open Line model may allow for significantly more efficient emergency assessment, location, and management of resources.

20 Claims, 6 Drawing Sheets

METHOD, APPARATUS, AND SYSTEM FOR PROVIDING REAL-TIME PSAP CALL ANALYSIS

CROSS REFERENCE TO RELATED APPLICATION

This application claims the benefit of U.S. Provisional Application Ser. No. 61/736,959, filed Dec. 13, 2012, entitled "PSAP REAL-TIME CALL ANALYSIS," which is incorporated herein by this reference in its entirety.

BACKGROUND

People who call 9-1-1 to report an incident sometimes cannot speak or make themselves understood for physical or safety reasons. This type of call is known as an Open Line, where the call is answered by the 9-1-1 facility but there is no intelligible voice or very difficult to understand speech. Because of this, emergency call-takers have to make difficult subjective decisions regarding how to best assist the caller. This may be dangerous for first responders since they have no idea what they might find at a scene. It also might be dangerous for the caller, who may not get the resources he or she needs in time. Additionally, such Open Line calls may result in wasted resources since these types of calls may require police, fire, and medical dispatch for safety reasons, even if only one type of dispatch or lower level of assistance is needed.

In response to the Open Line problem, some Public Safety Access Points (PSAPs) have implemented protocols that help the call-takers make decisions regarding how to handle such calls. However, there currently are no automated tools available to help these individuals glean additional information from the background or non-verbal portions of the call.

SUMMARY

The facilities that handle 9-1-1 calls are referred to as Public Safety Access Points (PSAPs). A 9-1-1 Open Line is defined as a 9-1-1 emergency call that has been answered by the 9-1-1 PSAP facility but no verbal response is being received from the caller. Many calls are not Open Line and are handled by standard protocols. For all calls, including Open Line calls or other difficult to understand calls, the disclosed method, apparatus, and system aid the emergency call-taker or dispatcher with background noise analysis, allowing him or her greater freedom to concentrate on the optimized speech intelligibility of voice instances of the incoming call.

The disclosed method, apparatus, and system suggest a new paradigm for the PSAP, particularly in view of the currently high and rapidly growing percentage of calls coming into PSAPs that are Open Line calls. When a call arrives, the incoming call may be split to facilitate real and near-real time analysis with greater accuracy. The capture and analysis of call elements by separating call streams in real-time, delivery of an audio speech intelligibility-optimized stream to the emergency call-taker and/or dispatcher, the use of automated sound identification libraries and tools, the use of a spectrogram display, and the automatic use of pop-up notification or auto-dispatch based on policies, facilitate immediate specific (and possibly automatic) actions on all incoming calls, including 9-1-1 Open Line calls, calls involving unintelligible callers, and/or calls involving callers who may not be actively participating in the call.

In PSAPs today, the audio stream received from the caller is transmitted, without modification, to the PSAP call-taker. The call-taker or dispatcher is expected to understand what the caller is saying, and is also expected to identify events that can be heard in the background. These represent two entirely different audio processing tasks, and digital signal processor (DSP) optimization of the audio stream for one of those tasks would make it harder for a person to perform the other. With this in mind, the disclosed method, apparatus, and system improve upon the current PSAP architecture by:

(1) splitting an audio stream into first and second instances,
(2) optimizing the speech intelligibility of the first instance sent to the call-taker,
(3) optimizing the second instance for background sound analysis by an automated process and/or a person other than the call-taker,
(4) relying on the automated process and/or the other person to analyze background sounds, and then
(5) presenting the results of the background sound analysis visually on a display to the call-taker or the dispatcher. The disclosed invention assists with the difficult task of identifying background noise while trying to listen and talk to a caller, and gives the best possible audio from the caller to an emergency call-taker or dispatcher.

Different signal processing methods can be applied to the incoming and outgoing audio streams to optimize acoustic characteristics for two types of real-time tasks. For example, speech intelligibility can be optimized, including noise filtration, for the voice instance of the audio stream. The background audio stream can also be optimized for the detection of, and sensitivity to, background sounds occurring around the person. If specific predefined audio signatures are recognized from the background audio instance, (e.g., Shots Fired), the call-taker or dispatcher user interface may be modified to reflect common actions to be taken by the call-taker; such actions may include one or more of the following: specific screens in the Computer Aided Dispatch (CAD) console; a specific protocol to be followed; and automating the call-taker's workload as much as possible to allow the call-taker to concentrate on interfacing with the caller.

Aspects of the present disclosure are thus directed toward improving emergency call assistance for all incoming calls to a PSAP, including both Open Line calls and calls that are not Open Line calls. Appropriate resources may be manually or automatically dispatched based upon enhanced informational analysis from non-verbal instances of the incoming calls.

While most of the exemplary embodiments discussed herein are principally targeted at 9-1-1 PSAP calls, the basic idea of performing call analysis based on verbal and non-verbal portions of a call could be useful in other environments, such as a penitentiary/penal complex or at a university. There are a number of instances where the ability to discern what is occurring in the background and further being alerted for certain elements may be useful for a prison, campus, or other environment.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. The database may be hosted within a communication server or on a separate server. Accordingly, the disclosure is considered to include a tangible storage medium and prior art-recognized equivalents and successor media, in which the software implementations of the present disclosure are stored.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

Additional features and advantages of embodiments of the present invention will become more readily apparent from the following description, particularly when taken together with the accompanying drawings.

DETAILED DESCRIPTION

Figure 1:
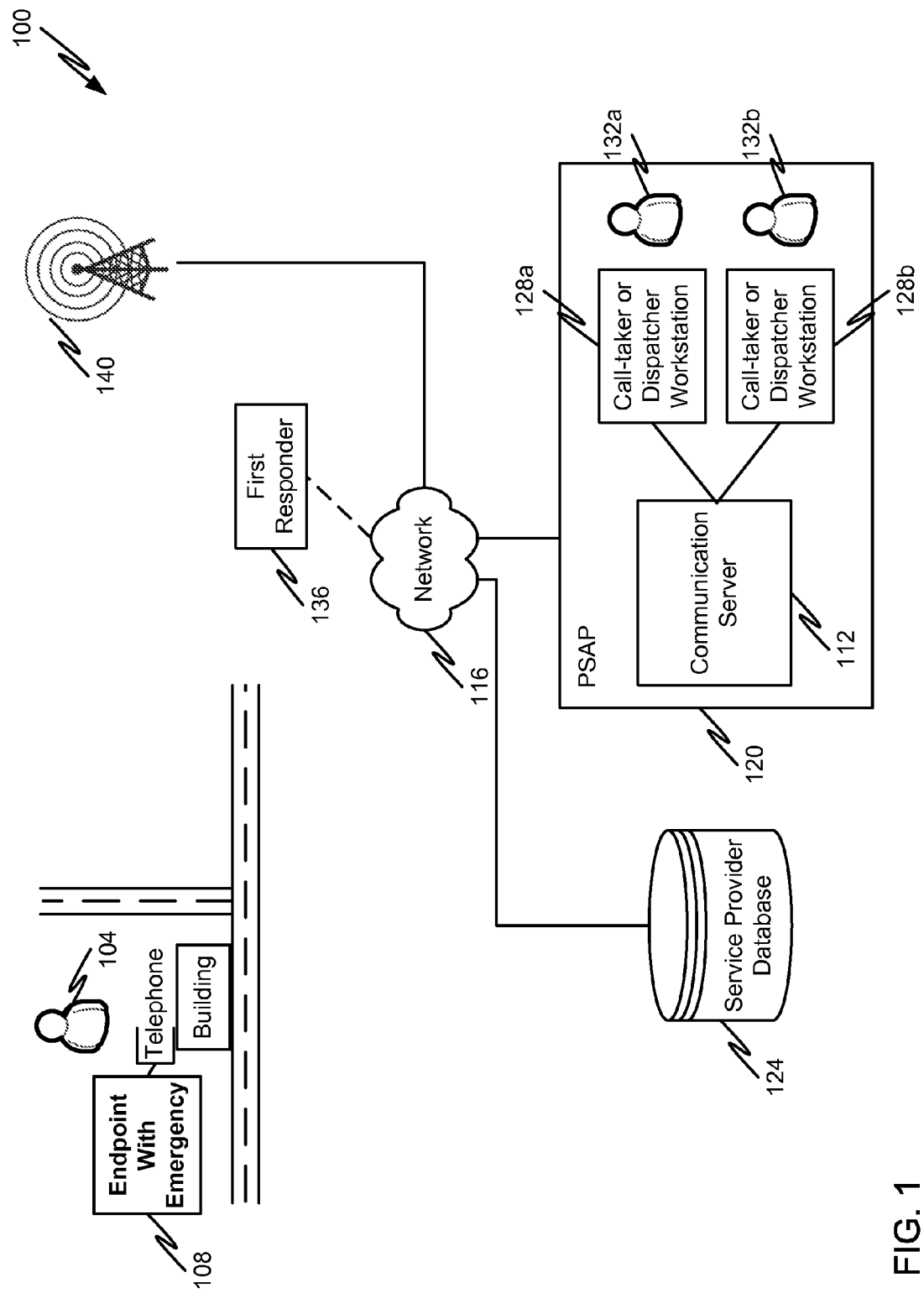
FIG. 1 is a block diagram of a communication system in accordance with embodiments of the present disclosure.

FIG. 1 is a block diagram depicting components of a communication system 100 in accordance with at least some embodiments of the present disclosure. In particular, the communication system 100 includes a Public Safety Access Point (PSAP) 120 that includes a communication server 112, one or more call-taker or dispatcher workstations 128, and one or more call-takers and/or dispatchers 132 operable to receive and respond to calls from communication endpoints 108 over a communication network 116. The communication system 100 may be a distributed system and, in some embodiments, comprise one or more communication networks 116 that facilitate communication between elements.

The communication network 116 may be packet-switched and/or circuit-switched. An illustrative communication network 116 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VoIP) network, a SIP network, or combinations thereof. In one configuration, the communication network 116 is a public network supporting the TCP/IP suite of protocols. Communications supported by the communication network 116 include real-time, near-real-time, and non-real-time communications. For instance, the communication network 116 may support voice, video, text, web-conferencing, or any combination of media. Moreover, the communication network 116 may comprise a number of different communication media such as coaxial cable, copper cable/wire, fiber-optic cable, antennas for transmitting/receiving wireless messages, and combinations thereof. In addition, it can be appreciated that the communication network 116 need not be limited to any one network type, and instead may be comprised of a number of different networks and/or network types. For illustrative purposes, a person 104 who witnesses or experiences an emergency may use a communication endpoint 108 to call into a PSAP 120 via the communication network 116. It should be appreciated that the communication network 116 may be distributed. Although embodiments of the present disclosure will refer to one communication network 116, it should be appreciated that the embodiments claimed herein are not so limited. For instance, multiple communication networks 116 may be joined by many servers and networks.

In accordance with at least some embodiments of the present disclosure, a communication device 108 may comprise any type of known communication equipment or collection of communication equipment. Examples of a suitable communication device 108, may include, but are not limited to, a personal computer or laptop with a telephony application, a cellular phone, a smartphone, a telephone, or other device which can make or receive communications. In general, each communication device 108 may provide many capabilities to the caller 104 who has an emergency. These capabilities may include, but are not limited to, video, audio, text, applications, and/or data communications and the ability to access call-takers and/or dispatchers 132 as well as services on the communication server 112 in the PSAP 120.

The communication network 116 may provide one or more communication devices 108 with access to call-takers and/or dispatchers 132 for emergency assistance. The communication server 112 generally functions to route calls and/or text-based messages from customer devices or endpoints 108 with emergencies to call-takers and/or dispatchers 132 in order to facilitate responses to the emergencies. In accordance with embodiments of the present disclosure, the calls and texts may comprise written, electronic, and voice communications. However, contacts are not necessarily limited to text and/or voice communications. For example, the PSAP 120 may be additionally equipped to handle video calls. As can be appreciated by one of skill in the art after consideration of the present disclosure, the communication server 112 may route communications to a workstation 128 for handling by a call-taker and/or dispatcher 132 according to various parameters. For example, communication server 112 may route a communication to a workstation 128 for handling by a call-taker and/or dispatcher 132 based on one or more areas of expertise and/or based upon a specific agency (e.g., fire, police, etc.) that a caller 104 requires assistance from. Moreover, the call-taker or dispatcher workstations 128 generally support the delivery of communications and information from callers 104 and service provider databases 124 to associated call-takers and/or dispatchers 132, and generally facilitate communications between the callers 104 and the call-takers and/or dispatchers 132. The call-taker or dispatcher workstations 128 may comprise general purpose computers, thin client devices, and/or other communications devices. In addition, the call-taker or dispatcher workstation 128 may include a user output in the form of a display that may present a plurality of information based on the caller's device 108 to an assigned call-taker and/or dispatcher 132; such presented information may include location, telephone number, type of communication, a map, and/or other details.

A Public Safety Access Point (PSAP) 120 may typically be a contact center that answers calls to an emergency telephone number. There may be one or more locations associated with the PSAP 120, depending on services available, covered municipalities, and ability to handle certain types of calls. Examples of services that may be offered by the PSAP 120 via the communication network 116 include communication services, media services, information services, processing services, application services, combinations thereof, and any other automated or computer-implemented services, applications, or telephony features. The PSAP 120 may be funded and operated by governmental units or associations of such units. Trained call-takers and dispatchers 132 may attempt to address emergencies using procedural guidelines and experiential knowledge.

A first responder 136 may be a first person or persons sent out in an emergency and/or in response to a 9-1-1 call. The first responder 136 may be the first medically trained person who arrives at an event. Typically in the United States and Canada, the first responder 136 may be a firefighter, a police officer, or an emergency medical services (EMS) team/unit.

The goal of the first responder 136 may be to provide first aid, stabilization, and/or transport prior to more advanced providers arriving at the event or providing care at a secondary location.

The communication device 108 may have information associated with it that is useful to the PSAP 120. For example, the information may include the name, number, and location of a caller 104. Location determination typically depends upon information stored and/or maintained in an Automatic Location Information (ALI) database. A service provider database 124 typically allows a PSAP 120 to look up an address that is associated with the caller's telephone number and/or endpoint 108. A wireless connection and/or cellular tower 140 may contain equipment including antennas, Global Positioning System (GPS) receivers, control electronics, digital signal processors (DSPs), transceivers, and backup power sources. The wireless connection and/or cellular tower 140 may be operable to carry and handover telephony and/or data traffic for communication devices 108, within a specified range, for communication with other communication devices 108, the PSAP 120, and first responders 136, that is accessible through the communication network 116.

Figure 2:
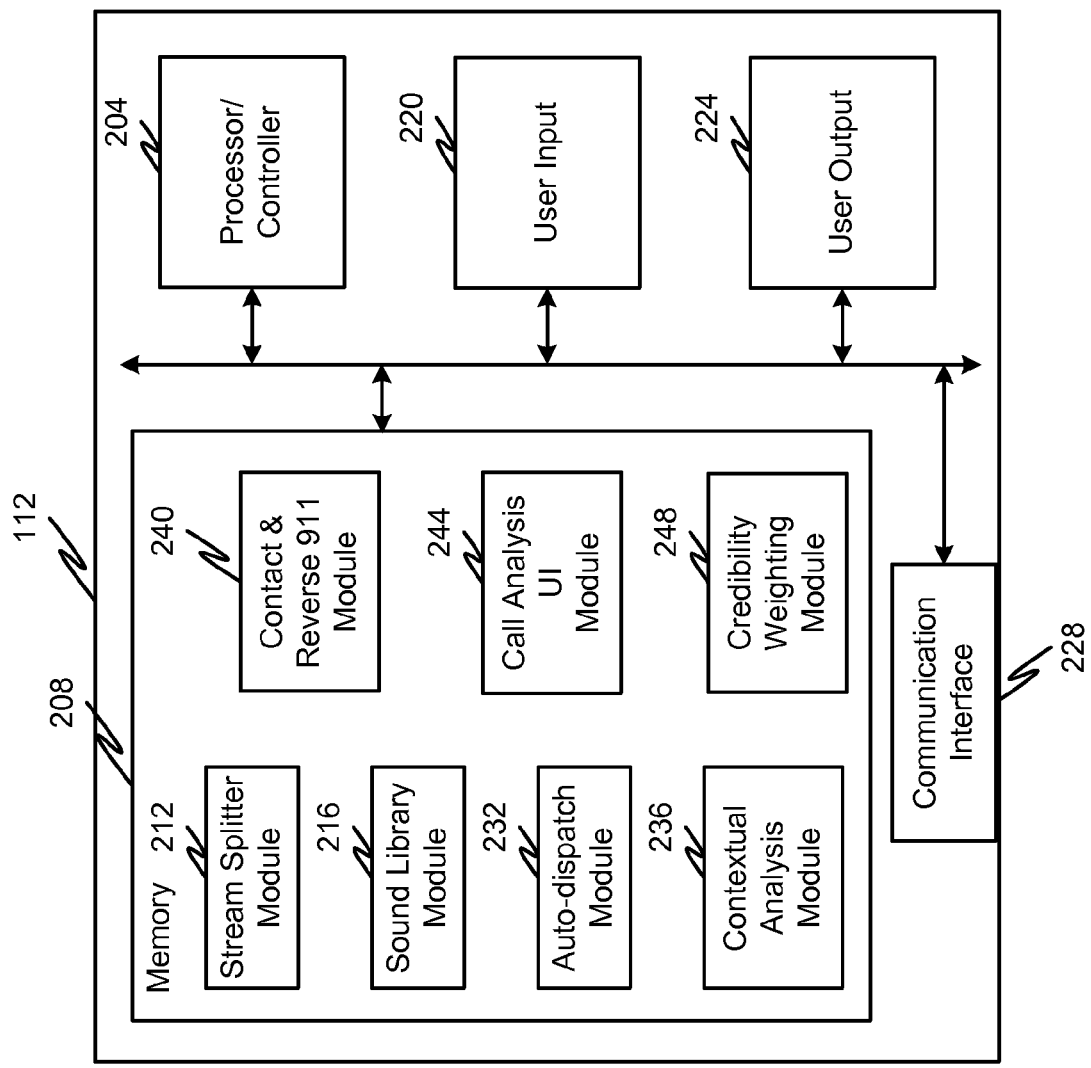
FIG. 2 is a block diagram depicting components of a communication server that can be utilized in accordance with embodiments of the present disclosure.

FIG. 2 is a block diagram depicting components of a PSAP communication server 112 in accordance with at least some embodiments of the present disclosure. In some embodiments, the communication server 112 can include a processor/controller 204 capable of executing program instructions. The processor/controller 204 may include any general purpose programmable processor or controller for executing application programming. Alternatively, or in addition, the processor/controller 204 may comprise an application specific integrated circuit (ASIC). The processor/controller 204 generally functions to execute programming code that implements various functions performed by the associated server or device. The processor/controller 204 of the communication server 112 may operate to route communications and present information to a call-taker or dispatcher workstation 128, and optionally to a first responder 136 as described herein.

The communication server 112 additionally includes memory 208. The memory 208 may be used in connection with the execution of programming instructions by the processor/controller 204, and for the temporary or long term storage of data and/or program instructions. For example, the processor/controller 204, in conjunction with the memory 208 of the communication server 112, can implement emergency services telephony, application, and web services that are needed and accessed by communication devices 108, the PSAP 120, and first responders 136, through the communication server's 112 modules.

For example, the communication server 112 memory 208 may include software implementing a voice stream splitter module 212, a sound library module 216, an auto-dispatch module 232, a contextual analysis module 236, a contact/reverse 9-1-1 module 240, a call analysis user interface module 244, and a credibility weighting module 248, to provide access to and the capabilities of the PSAP emergency system 120 that may be executed by the modules. Moreover, content from the modules may include information that is rendered by the call analysis user interface (UI) module 244 for display on the call-taker or dispatcher workstation 128.

The memory 208 of the communication server 112 may comprise solid state memory that is resident, removable and/or remote in nature, such as DRAM and SDRAM. Moreover, the memory 208 may comprise a plurality of discrete components of different types and/or a plurality of logical partitions. In accordance with still other embodiments, the memory 208 comprises a non-transitory computer readable storage medium. Such a medium may take many forms, including but not limited to, non-volatile media, volatile media, and transmission media.

In addition, user input devices 220 and user output devices 224 may be provided and used in connection with the routing and processing of calls to a PSAP 120 for handling by a call-taker and/or dispatcher 132. However, the call-taker and/or dispatcher 132 typically interfaces with the PSAP 120 through a call-taker or dispatcher workstation 128, where the call-taker or dispatcher workstation 128 each is associated with one or more user inputs and one or more user outputs. Examples of user input devices 220 include a keyboard, a numeric keypad, a touch screen, a microphone, scanner, and pointing device combined with a screen or other position encoder. Examples of user output devices 224 include a display, a touch screen display, a speaker, and a printer. The communication server 112 also generally includes a communication interface 228 to interconnect the communication server 112 to the communication network 116.

Figure 3:
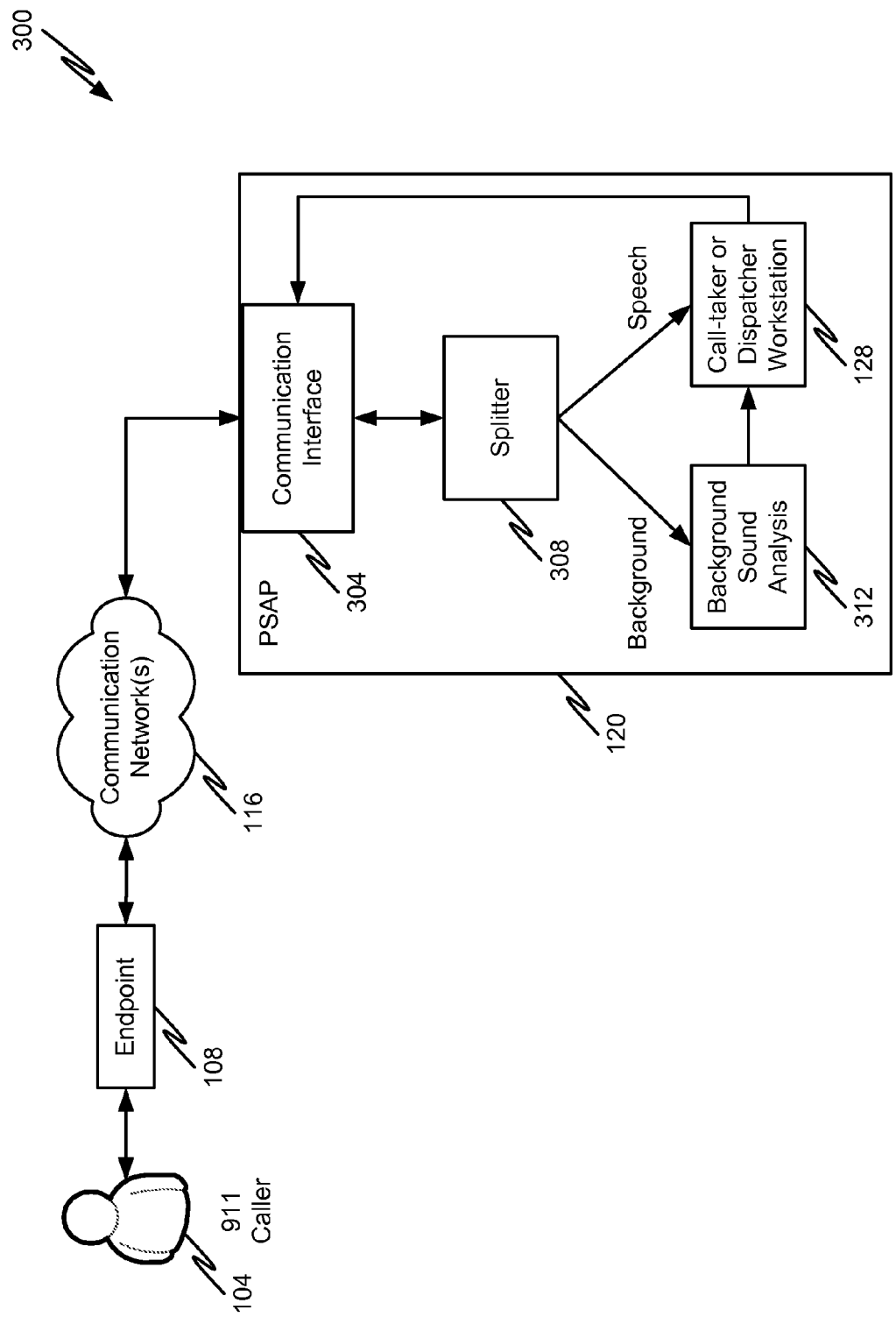
FIG. 3 is an example of a call flow from a 9-1-1 caller to a PSAP in accordance with the embodiments of the present disclosure.

FIG. 3 illustrates an example of a call flow from a person or 9-1-1 caller 104 to a PSAP 120. For example, the 9-1-1 caller 104 may be experiencing or witnessing an emergency, and may initiate a call from an endpoint 108 to a PSAP 120 over the communication network 116. The 9-1-1 caller 104 initiates a call to a PSAP by calling a three-digit access code (in the United States, 9-1-1 is the access code). The system 112 may automatically attempt to associate the location of the endpoint 108 or the location of the 9-1-1 caller 104 with the origin of the call. The location information may then be used to dispatch fire, police, emergency medical services, and/or other resources that may be necessary.

In an example scenario, an incoming call to the PSAP 120 is received by a communication interface 304. In some instances, the 9-1-1 caller 104 may be unable or unwilling to speak and the call may be flagged as an Open Line call. In other instances, the 9-1-1 caller 104 may be completely understandable and may even actively participate in the call, providing details and/or assisting the call-taker and dispatcher 132 with information. Audio information transmitted as part of the call may then be provide to the splitter 308. The splitter 308 may be implemented in hardware and/or by the stream splitter module 212 and may provide at least a first instance of the audio information to a background sound analysis module or facility 312. The splitter 308 may also provide at least a second instance of the audio information to a call-taker or dispatcher workstation 128. It may be beneficial to split the signal to improve speech intelligibility so that a call-taker and/or dispatcher 132 has the best chance of hearing and understanding any speech that may be present. By creating a second instance for background sound analysis, the speech intelligibility can be optimized in the first instance without affecting or compromising the identification of background sounds in the second instance. Additional details as to why optimizing for speech intelligibility may negatively affect background sound analysis are more fully described in U.S. Pat. No. 6,889,186 to Michaelis, the entire contents of which are hereby incorporated herein by reference.

The background sound analysis 312 may operate in conjunction with a sound library module 216 and may automatically analyze sounds such as, but not limited to, power signatures, bioacoustics, animal sounds, gunshot sounds, background speech and announcements, noise from transportation vehicles like planes, trains, and automobiles, water sounds, office sounds, nature sounds, tool sounds, and other miscellaneous sounds. The automatic analysis may include a cross-reference and match of the identifiable sounds; alternatively, or in addition, the cross-reference and match may be performed manually by a person. The automatic analysis may include a comparison with known entries in the sound library module 216, wherein identified sounds may be added to the sound library module 216. The sound library module 216 may also provide a result of the automatic analysis of the first instance of the audible information to a call-taker and/or dispatcher 132 through a call analysis UI module 244. The splitter 308 may also provide the at least a second instance of the audible information, which is an intelligibility-optimized audio stream, to a call-taker or dispatcher workstation 128 through the call analysis UI module 244.

In an embodiment that applies at least partial manual processing of background sounds, the analysis of the second instance of the audible information may be performed by a second call-taker and/or dispatcher 132b. Upon receiving an incoming call, a first call-taker and dispatcher 132a may attempt to communicate with the calling party while a second call-taker and/or dispatcher 132b may be assigned to manually perform a background sound analysis. For example, the second call-taker or dispatcher 132b may use the sound library module 216, the contextual analysis module 236, and the credibility weighting module 248 within the communication server 112 to investigate the background sounds while the first call-taker and/or dispatcher 132a may attempt to establish or understand verbal communications from the calling party. Moreover, this configuration is especially useful in instances where the calling party is unintelligble or unable to speak and/or when the incoming call has been identified as an Open Line call.

As an illustration, the second call-taker and/or dispatcher 132b may first remove his or her telephone headset and put on a high-quality set of headphones. A display may give him or her access to the second instance of the audible information (e.g., background noise instance) and/or to both instances as a mixed signal or stream (for context). A library of sounds may be available for manual comparison in the sound library module 216 to help with sound identification. A graphical display may depict both call instances, enhancing the ability of the second call-taker and/or dispatcher 132b to visually analyze the audio signals. The second call-taker and/or dispatcher 132b may use simple signal processing to filter out apparent noise and/or to amplify the audio signals to search for signals. For instance, a software mixer panel may allow the second call-taker and/or dispatcher to concentrate on sounds at certain frequencies. Various levels of audio and speech enhancement tools may be used, based on the resources of the PSAP 120, to enhance the audio and speech of an incoming call. For example, the second call-taker and/or dispatcher 132b may select a portion of the timeline (e.g. portions of it, all of it, above threshold, manually chosen) and apply a selected enhancement based on the PSAP's 120 predefined guidelines.

Figure 4:
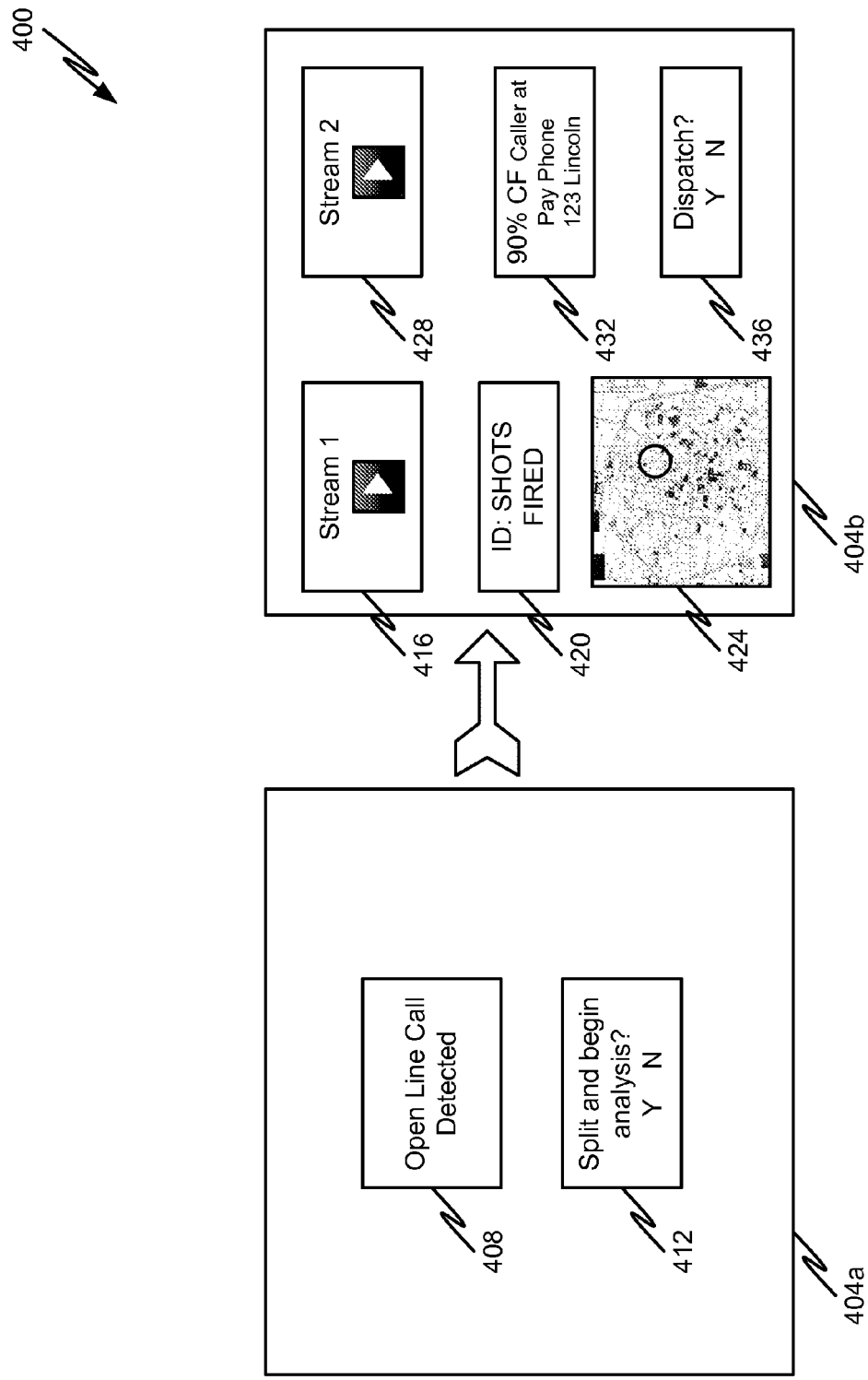
FIG. 4 is an example of a call-taker user interface in accordance with the embodiments of the present disclosure.

FIG. 4 illustrates an example of a call-taker user interface (UI). While a general description and depiction of the UI is shown in FIG. 4, the UI example 400 may include more or fewer displays, elements, or the placement of the elements can be arranged differently than those shown in FIG. 4. The depiction of the UI 400 assumes that the display can be created as a set of computer-executable instructions executed by a computer system and encoded or stored on a non-transitory computer readable medium, additionally requiring an external monitor or other display.

A display or user interface 404a may be created by the call analysis UI module 244 when a call is received at a PSAP 120; the user interface 404a may be presented to the call-taker and/or dispatcher 132 at a call-taker or dispatcher workstation 128. As illustrated in FIG. 4, a pop-up window may be provided, for example—pop-up window 412, that allows the call-taker and/or dispatcher 132 to choose to split the call and begin analysis on the non-verbal background instance of the call. The decision to split the call may be based on identifying the call as an Open Line call. Alternatively, or in addition, all incoming calls received at a PSAP may be automatically split, for example as part of a standard operating procedure. The call-taker or dispatcher workstation 128 may be updated as analysis proceeds, as illustrated in 404b. For example, a primary panel, such as the display UI 404b, may be presented at the call-taker or dispatcher workstation 128. As illustrated, stream 1 416 and Stream 2 428 may be presented to a call-taker and/or dispatcher at the call-taker or dispatcher workstation 128 and may correspond to the spectrograms of the incoming and outgoing call streams (intensity of signal as a function of time and frequency), and further include time markers. Contents, or portions of the call or audio signal, that appear to be events of importance may be identified and marked by the call-taker and/or dispatcher 132. Events, such as transcribed speech, may be marked in a distinctive manner and may be made available via the PSAP system 120 for additional review.

Sounds that were identified in the analysis using the sound library module 216 may be displayed in any reasonable format, as shown as the box of text 420. For example, a call might come in with no intelligible voice. It may be designated by the communication server 112 or the call-taker and/or dispatcher 132 as an Open Line call. The background instance of the call may be subjected to automatic analysis while the call-taker and/or dispatcher 132 attempts to make verbal contact. The sound library module 216 may perform an analysis and return the results of the analysis. For example, the sound library module 216 may return the results of an analysis as a 9 mm discharge×3 and present the results of the analysis as ID: Shots Fired 420. The call-taker and/or dispatcher 132 may click on or hover over the box of text 420 to see specific details of the analysis. The message 420 on the display 404b may alert and/or inform the call-taker an/or dispatcher 132 and first responders 136 to take certain procedural steps when responding to the call. The call-taker and/or dispatcher 132 may also change his or her approach of handling an emergency caller 104 or may follow different procedures based on the background sound analysis 312.

A map 424 may comprise a portion of the UI 404b. Depending on the sophistication of the system, a map 424 may be automatically displayed based on the incoming automatic number identification (ANI); alternatively, or in addition, a map may be available to the call-taker and/or dispatcher 132 such that the call-taker and/or dispatcher 132 can identify the location of the incoming call provided by the service provider database 124. The map may additionally indicate the location of all first responders 136 in the vicinity.

The UI 404b may also include an additional component that displays a credibility factor 432 that may be calculated based on known data. For example, a weighted average may be taken from multiple data that includes known, estimated, or likely data. Structure parameters may then be estimated from the data. Typically, this credibility factor may be expressed as Z, a number between zero and one. In the example provided, a credibility factor Z 432 may be expressed as a percentage and presented to the call-taker and/or dispatcher 132 on the call-taker or dispatcher display 128 (e.g., 90%). A statistical analysis may then be performed on known data.

For example, the background sound analysis 312 may provide, as part of the automated assessment, a readout of "ambient traffic sounds." The ANI location may be presented by the service provider database 124 with a readout of an address, like "123 Lincoln St." A Class of Service (COS) designation might include the type of endpoint or extension parameters. A Geographic Information System (GIS) may indicate that there is a pay telephone at the corner of Lincoln St. and $3^{rd}$ Avenue.

COS="Outdoor Coin Telephone"
BG Audio="Ambient Traffic Sounds"
Location="123 Lincoln St."
GIS Data="Pay telephone, corner of Lincoln and $3^{rd}$"

Each of these features may be evaluated by an algorithm that determines the credibility factor 432. Output of an algorithmic analysis may be provided as a probability statement based on two or more elements presented. For example, "There is a 90% probability that the caller is at the pay telephone bank outside of a building, rather than inside at the lobby telephone." The credibility factor 432 may be displayed on the call-taker or dispatcher workstation 128 in a variety of forms, including but not limited to plain text, a graphical display, an image, or other display type.

After the sound analysis begins 412, a pop-up window or other on-screen notification may appear in the display 404b. If the decision as to whether or not an Open Line call has been detected is made manually, the decision to dispatch 436 resources may present a simple yes or no option to the call-taker and/or dispatcher 132. The display option for dispatching resources 436 may be presented as soon as the call is answered in the PSAP 120, the call type has been designated 408, as soon as one or both of the displays 404a, 404b have been created, after additional manual analysis has been performed, at any time after the 9-1-1 caller 104 has initiated the 9-1-1 call, or after the 9-1-1 call has been terminated by the 9-1-1 caller 104 or the PSAP 120.

Each element of the display 404b may include one or more additional levels of detail. That is, an ability to click on or hover over the element for the next level of information may be available for some elements. For example, by clicking on the element for Stream 1 416, two spectrograms may be presented displaying temporal regions in which the volume of the incoming stream is above an adjustable threshold. This would allow the call-taker and/or dispatcher 132 to concentrate on or review regions that are most likely to yield information. Additionally, the contact and reverse 911 module 240 may be operable to cause another window with a hover-over or click action to be opened for the option to dispatch additional resources 436. If "yes" is chosen for dispatch 436, additional dispatch level and out-calling options may be presented in a secondary window and/or in another format. The options may comprise information pertaining to the location and availability of first responders 136, out-calling guidelines and options, and other policy and informational services available to the PSAP 120. If "no" is chosen for dispatch 436, a text box or reason list may appear for the call-taker and/or dispatcher 132 to note the reason for a decision not to dispatch resources. Other data relevant to the call, such as the history of the steps the call-taker and/or dispatcher 132 have taken and time-stamped CAD (Computer Aided Dispatch) entries, may also be part of the secondary display.

Additional portions of the UI in primary windows, secondary windows, and/or other display windows, may include options such as telephone controls, ACD displays and timers, audio controls, a Short Message Service box, caller and emergency fields, response agencies window, speed dial options, training materials, and other links.

Alternatively, or in addition, when the communication is text-based, a prompt for a sound analysis may be presented. The text-based communication may be received by the call-taker and/or dispatcher 132 in the PSAP 120. If there is an indication by the sender of the text-based communication that there is an issue preventing him or her from calling or if a policy exists regarding certain words or phrases contained within the text-based communication, the PSAP 120 communication server 112 may initiate the opening of a voice channel, allowing the call-taker and/or dispatcher 132 to start a background sound analysis 312. The text message received by the PSAP 120 would include sufficient identification information pertaining to the sender (texting party) which may enable the recipient (in this case, the PSAP 120) to open a voice channel. Alternatively, or in addition, when Session Initiation Protocol (SIP) has been used as the communication protocol, the text message may be established as an ephemeral based SIP session. In this particular example, the media type may be identified as text and identification of the texting party may not be need as the recipient (in this case, the PSAP 120) may have configured the communication server 112 with prompting to change or modify the media type in the communication session to a voice or video session using a media escalation process.

Figure 5:
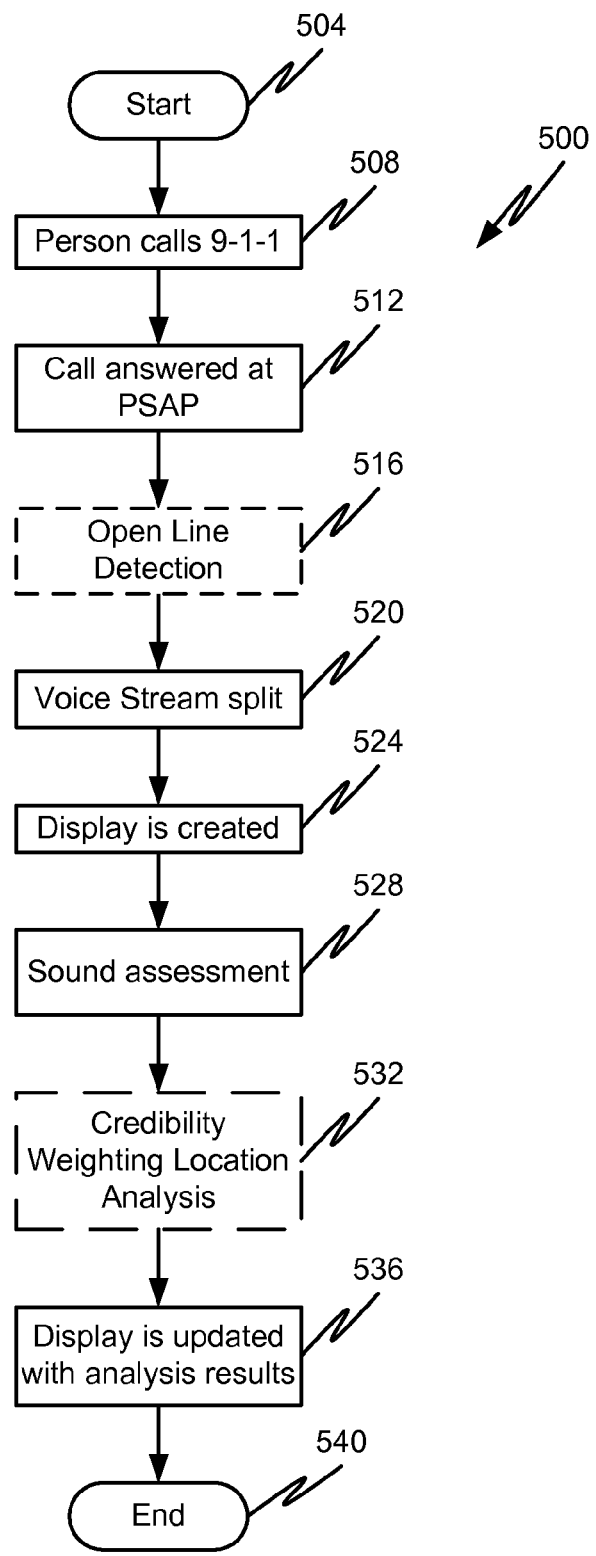
FIG. 5 is a flowchart depicting an exemplary method for optimizing 9-1-1 call handling in accordance with embodiments of the present disclosure.

FIG. 5 is a flowchart depicting an exemplary method for optimizing 9-1-1 call handling in accordance with embodiments of the present disclosure. While a general order for the steps of the method 500 are shown in FIG. 5, the method 500 can include more or fewer steps or the order of the steps can be arranged in a different order than those shown in FIG. 5. Method 500 is in embodiments performed by a device, such as the communication server 112. More specifically, one or more hardware and software components may be involved in performing method 500. The method 500 may be executed as a set of computer-executable instructions executed by a computer system and encoded or stored on a computer-readable medium. Hereinafter, the method 500 shall be explained with reference to the systems, components, modules, software, etc. described in conjunction with FIGS. 1-4. Method 500 may continuously flow in a loop, flow according to a timed event, or flow according to a change in an operating or status parameter. Method 500 is initiated at step 504 and proceeds to step 508 where a person 104 with an emergency may use a communication device 108 to make an emergency call to 9-1-1. A call-taker and/or dispatcher 132 in a PSAP 120 may answer the emergency call, in step 512, typically with a phrase like, "9-1-1, what is your emergency?" or "Springfield 9-1-1, where is your emergency?"

The expectation is that the person 104 with the emergency will verbally relate the circumstances of the emergency to the call-taker and/or dispatcher 132. In step 516, an optional determination may be made as to whether or not intelligible speech information is available on the call. If there is an affirmative verbal response to the query of the call-taker 132, the call may proceed using normal PSAP procedures and protocols, and proceed to step 520. Normal procedures and protocols may ideally include the caller 104 telling the call-taker 132 what the emergency is, for example, "My house is on fire!" or "I just saw a car roll over on Interstate 55 just south of W. Lakeshore Drive." Queries from the call-taker 132 may include location information, responsible party, description of people, vehicles, timeframe, telephone number, a caller's name, etc. Through a series of scripted questions, a call-taker 132 may determine type of emergency, urgency, and other basic information. The call-taker 132 typically may make an informed, subjective decision as to what is needed. An alert may be sent by the call-taker 132 through a computer system to notify and dispatch appropriate resources. This might include police, fire, and medical/ambulance services.

In some cases, the person 104 with the emergency may be unable or unwilling to verbally relate the circumstances of the emergency to the call-taker 132. If there is no voice or the voice is difficult to understand, the call-taker 132 or the communication server 112 may identify the call as an Open Line call. An Open Line call is described as a call that the PSAP answers where there is no discernible voice. Typical reasons for Open Line calls include unattended children playing with the telephone, domestic disputes, misdials, etc. Call-takers and/or dispatchers 132 may be required to send first responders 136, including police, based on procedures and protocols for each Open Line call. The person 104 with the emergency may be in danger or may be injured in such a way as to be unable to verbally communicate the emergency to the call-taker 132. Police and other emergency resources may be wasted responding to non-emergency Open Line calls when a call is placed accidentally and when there is not an emergency.

When the call-taker 132 determines that the call is an Open Line call, he or she may indicate through the PSAP 120 communication server 112 display 404*a* that the call is in fact an Open Line call. Once the call has been determined to be an Open Line call, procedures, in addition to the method 500, may be followed by the PSAP. For example, an Open Call may require the PSAP to log the call for statistical purposes and/or for identifying particular problem callers or callers that frequency misdial 9-1-1. Regardless of whether the call has been determined to be an Open Line call or a non Open Line call, the call-taker 132 may request that the stream splitter module 212 in the communication server 112 split the audio stream and begin background sound analysis, in step 520. The call stream may be split by a splitter 308. A display 404*b* is created, in step 524, which may give the call-taker 132 access to two distinct audio instances. One instance of audio information may be optimized for speech to give the call-taker and/or dispatcher 132*a* the best possible chance of hearing or recognizing any speech on the line, and a second instance may be sent for background sound analysis 312. When delivered to the call-taker and/or dispatcher 132*a*, the first instance of audio information may comprise pre-filtered digitized speech and include a frame analysis. A set of characteristics that may be enhanced on the voice-only audio stream may include, but are not limited to, any set of auditory and/or acoustic-phonetic measures such as frequency, volume, and speed while removing background ambient noise, microphone crackle, wind rumble, and electrical hum. Additionally, it may be possible to boost or reduce various audio frequencies. Furthermore, the signal-to-noise ratio may be increased by several decibels while still maintaining audio stream integrity.

In step 528, the analysis may begin on the second instance of audio information, either automatically by the communication server 112 or by a second call-taker or dispatcher 132*b*. The analysis might typically be performed using a library of selected sound signatures for reference, though other reference methods could be used. One or more advanced sound recognition algorithms may be used to automatically detect and classify sounds recorded during the call. Elements that may be considered by the algorithm include frequency, zero-crossing counts, harmonics, repetition, duration, and intelligibility. Additional filtering may be applied to the second instance of audio information including, but not limited to, extraneous noise removal, hard effect removal after identification, balancing, enhancement, reduction, snap-shotting, phase correction, changing sound speed, or altering other sound characteristics. Similar sounds may be grouped together for a weighted analysis and dissimilar sounds may be recognized as having different characteristics and may be analyzed accordingly. Alternatively, or in addition, the call-taker and/or dispatcher 132 may mark and send specific portions of the second instance of audio information for additional automatic or manual background sound analysis 312.

Additionally, the display of a credibility factor 432 may be calculated based on known data, in optional step 532. The credibility factor, as previously described, may be calculated based on a weighted average taken from multiple data that include known, estimated, or likely data. An output may include a credibility factor (CF) 432 expressed as a percentage. Data may be evaluated by an algorithm that determines the credibility factor 432. The output of the algorithmic analysis may be a probability statement based on two or more elements presented. For example, an example output may be, "There is a 90% probability that the caller is at the pay telephone bank outside of a building, rather than inside at the lobby telephone." The credibility weighting location analysis 432 in step 532 may be presented to the call-taker and/or dispatcher 132 as part of the display 404*b*.

In step 536, the call-taker or dispatcher workstation 128 may be updated with information from any or all of the previous steps, automated algorithmic assessment, system database information, ANI information, and any other source of information related to the communication, the 9-1-1 caller 104, PSAP 120 resources, CAD entries, timers, and analyses.

Method 500 then ends at step 540. As new calls arrive at the PSAP 120, the audio optimization, automation, analysis, and presentation method may begin again at step 504, as previously described with regard to method 500.

Figure 6:
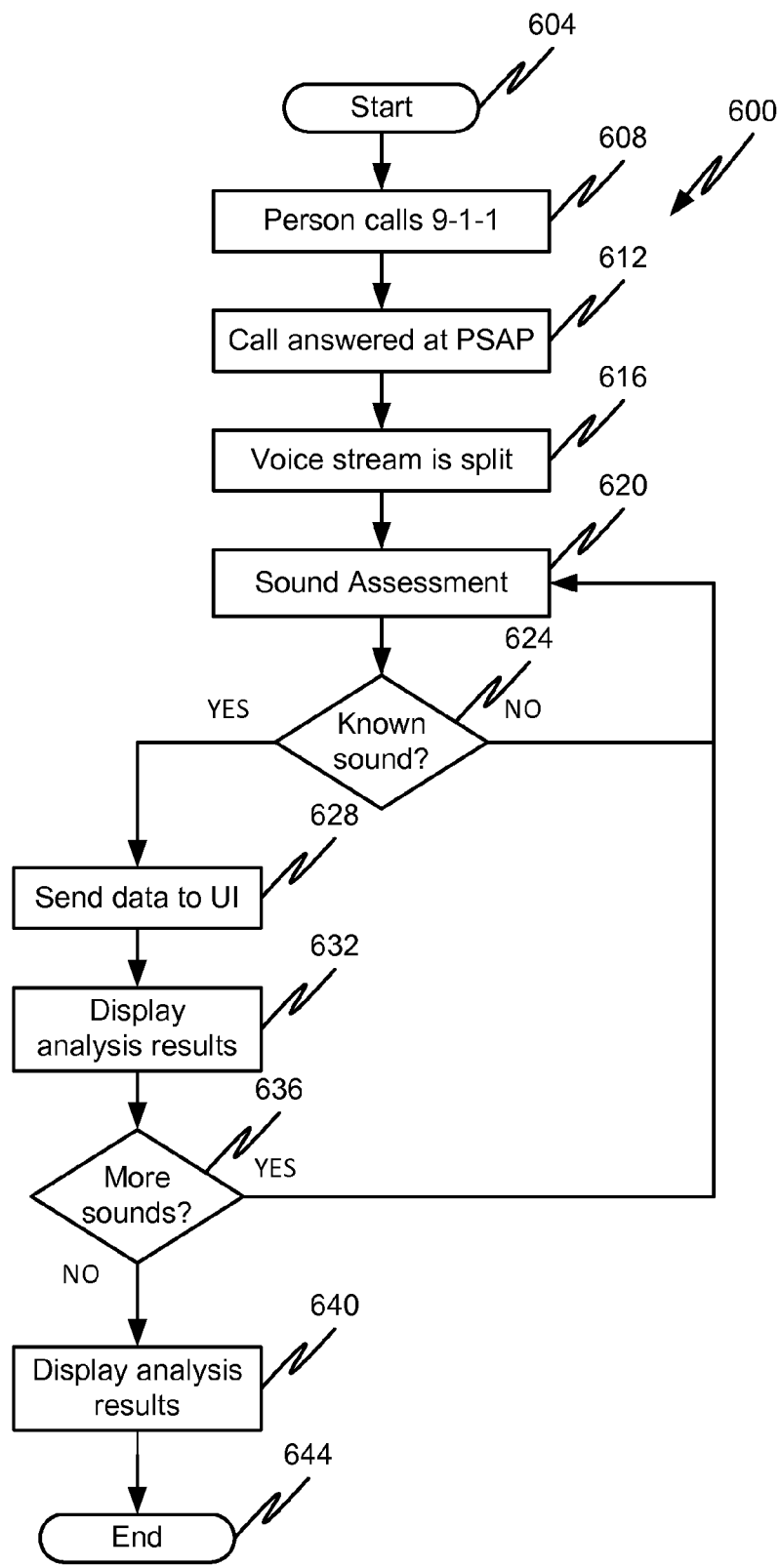
FIG. 6 is a flowchart depicting a split-signal method for sound analysis in accordance with embodiments of the present disclosure.

FIG. 6 is a flowchart depicting a split-signal method for sound analysis in accordance with embodiments of the present disclosure. While a general order for the steps of the method 600 are shown in FIG. 6, the method 600 can include more or fewer steps or the order of the steps can be arranged differently than those shown in FIG. 6. Method 600 is in embodiments performed by a device, such as the communication server 112. More specifically, one or more hardware and software components may be involved in performing method 600. The method 600 may be executed as a set of computer-executable instructions executed by a computer system and encoded or stored on a computer-readable medium. Hereinafter, the method 600 shall be explained with reference to the systems, components, modules, software, etc. described in conjunction with FIGS. 1-4. Method 600 may continuously flow in a loop, flow according to a timed event, or flow according to a change in an operating or status parameter. Method 600 is initiated at step 604 and proceeds to step 608 where a person 104 with an emergency may use a communication device 108 to make an emergency call to 9-1-1. An emergency call may be received and answered at a PSAP 120, in step 612. A call-taker and/or dispatcher 132 may ask the caller 104 for information. In some situations, no specific or identifiable verbal information is given by the caller 104. The call-taker or dispatcher 132 or a communication server 112 identifies the emergency call as an Open Line call and proceeds to step 616 for additional background analysis. In other situations, the caller 104 is easy to understand and is an active participant in the call. The method may proceed to step 616 for additional background analysis.

In step 616, an emergency call may be split into at least a first instance of audible information and a second instance of audible information by either a stream splitter software module 212 or a hardware device that is a splitter 308. The first instance of the call stream may be optimized for speech intelligibility. The second instance of the call stream may be analyzed for background noise.

In step 620, the second instance of audible information may be presented for automated sound assessment. The signal processor may remove voice, static, or other noise which would not be relevant for background sound analysis 312. After the second instance of audible information has been optimized for assessment, any sound segments or the entire second instance of audio information may be compared to known sounds in a sound library module 216 in step 624; the sound library module 216 may have access to or may contain a sound library or libraries. If the sounds are known, sound match data may be sent to memory 208 in the communication server 112 for display by a call analysis UI module 244. Known sounds with sound match data may also be converted to text, image, or other type of display by the call analysis UI module 244 and sent to the call-taker or dispatcher workstation 128, in step 628. The call-taker or dispatcher workstation 128 may be updated with the one or more analyses results, in step 632. Portions of the display may be interactive, including but not limited to the first instance 416, the second instance 428, and a dispatch decision 436. In step 636, a determination may be made as to whether additional sounds are present for sound matching. If there are more sounds for analysis, the process may begin a new background sound analysis 312 as described in step 620. If there are no more sounds available for analysis, the process proceeds to step 640. In step 640, the analysis is considered complete, the call analysis UI module 244 may run an update and send any remaining results to the call-taker or dispatcher workstation 128. The process ends at step 644, where additional post-call and/or forensic analysis may optionally take place.

Alternatively, or in addition, the sound analysis may be done manually by an additional call-taker and/or dispatcher 132 rather than automatically. In this embodiment, a separate call-taker or dispatcher workstation 128 display would be created, allowing for manual specialized background sound analysis 312 using similar tools and methods.

As can be appreciated by one of skill in the art, after consideration of the present disclosure, the provision of a new, multi-faceted PSAP paradigm which includes signal splitting, specialized optimization and automatic analysis of voice, data, background, and resource information, and specific presentation of the analyses on an enhanced workstation display can assist a call-taker or dispatcher in providing the appropriate level of support for calls while still preserving precious resources. Therefore, by providing optimized support for PSAP response, systems, apparatus, and methods as disclosed herein can lead to more efficient assistance and resource management, and ultimately result in saved lives.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software. Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for handling emergency calls, comprising:
receiving a call that includes audible information;
delivering the audible information to a stream splitter module;
using the stream splitter module, creating a first instance of the audible information and a second instance of the audible information;
providing the first instance of the audible information to a speech intelligibility optimizer;
using the speech intelligibility optimizer, optimizing the first instance of the audible information;
providing an optimized first instance of the audible information to a workstation;
providing the second instance of the audible information to a sound library module for background sound analysis;
comparing the second instance of the audible information to known sound information in the sound library module; and
providing the background sound analysis of the second instance of the audible information to the workstation.

2. The method of claim 1, wherein the one or more calls are received at a PSAP (Public Safety Answering Point).

3. The method of claim 1, further comprising answering the call.

4. The method of claim 3, further comprising:
determining that the call is an Open Line call; and
in response to determining that the call is an Open Line call, initiating Open Line call procedures.

5. The method of claim 4, wherein Open Line call procedures include generating a display on the workstation requesting validation of the Open Line call and creation of the at least first instance of the audible information.

6. The method of claim 1, wherein a call analysis user interface module provides the optimized first instance of the audible information and a comparison result of the second instance of the audible information to at least one of a call-taker and a dispatcher.

7. The method of claim 1, wherein a display is generated on the workstation, the display comprising at least one of the optimized first instance of the audible information, the second instance of the audible information, the background sound analysis of the second instance of the audible information, a map, a credibility factor, a dispatch decision pop-up, telephone controls, speed dial options, a timer, a Short Message Service (SMS) box, a response agencies window, and training materials.

8. The method of claim 7, further comprising:
based on the display, determining an emergency exists requiring dispatch.

9. The method of claim 8, further comprising:
determining resources to dispatch in response to determining an emergency requiring dispatch exists.

10. A system that facilitates the handling of emergency calls, comprising:
a communication server, including:
a communication interface;
a processor;
memory, wherein modules are stored in the memory and executed by the processor,
wherein the modules operate to receive calls at the communication server that include audible information, wherein the modules operate to create a first instance of the audible information for speech and a second instance of the audible information for background noise, wherein the modules operate to optimize the first instance of the audible information, wherein the modules operate to analyze the second instance of the audible information, and wherein the modules provide an output of an optimization and an output of an analysis to a workstation.

11. The system of claim 10, wherein the one or more calls are received at a PSAP (Public Safety Answering Point).

12. The system of claim 10, further comprising:
a stream splitter module that creates a first instance of audible information and a second instance of audible information;
a sound library module that performs a background sound analysis to compare the second instance of the audible information to known sound information;
a credibility weighting module that computes a weighted average based on multiple data;
a call analysis user interface module that creates a display;
an auto-dispatch module that dispatches emergency resources; and
a contact and reverse 911 module that transmits emergency messages.

13. The system of claim 12, wherein the call analysis user interface module further operates to generate a display on the workstation requesting validation of the Open Line call and creation of the at least first instance of the audible information.

14. The system of claim 12, wherein the call analysis user interface module further operates to provide the optimized first instance of the audible information and a comparison result of the second instance of the audible information to at least one of a call-taker and a dispatcher.

15. The system of claim 14, further comprising determining, based on the display, whether or not there is an emergency requiring dispatch.

16. A non-transitory computer readable medium having stored thereon computer executable instructions, the computer executable instructions causing a processor to execute a method for facilitating emergency call handling by a communication system, the computer executable instructions comprising:
instructions to receive a call that includes audible information;
instructions to deliver the audible information to a stream splitter module;
instructions to use the stream splitter module to create a first instance of the audible information and a second instance of the audible information;
instructions to provide the first instance of the audible information to a speech intelligibility optimizer;
instructions to use the speech intelligibility optimizer to optimize the first instance of the audible information;
instructions to provide an optimized first instance of the audible information to a workstation;
instructions to provide the second instance of the audible information to a sound library module for background sound analysis;
instructions to compare the second instance of the audible information to known sound information in the sound library module as part of the background sound analysis; and
instructions to provide a result of the background sound analysis of the second instance of the audible information to the workstation.

17. The non-transitory computer-readable medium of claim 16, wherein the instructions to receive the call including audible information includes instructions to assist one of a call-taker and a dispatcher with an analysis of an Open Line call.

18. The non-transitory computer-readable medium of claim 16, wherein the optimization of the first instance of audible information includes adjustments for acoustic characteristics, speech intelligibility, and noise filtration.

19. The non-transitory computer-readable medium of claim 16, wherein the analysis of the second instance of the audible information includes comparisons involving power signatures, bioacoustics, animal sounds, gunshot sounds, background speech, announcements, noise from planes, noise from trains, noise from automobiles, water sounds, office sounds, nature sounds, and tool sounds.

20. The non-transitory computer-readable medium of claim 16, wherein the workstation corresponds to at least one of a general purpose computer, a tablet, a laptop, and a thin client device.

* * * * *